(12) United States Patent
Frehn et al.

(10) Patent No.: US 10,068,273 B2
(45) Date of Patent: Sep. 4, 2018

(54) METHOD FOR DELIVERING A CUSTOM SANDWICH TO A PATRON

(71) Applicant: Momentum Machines Company, San Francisco, CA (US)

(72) Inventors: Steven Frehn, San Francisco, CA (US); John Lawrence McDonald, Oakland, CA (US); Alexandros Vardakostas, San Francisco, CA (US); Harry Shapiro Hawk, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 1004 days.

(21) Appl. No.: 14/208,149

(22) Filed: Mar. 13, 2014

(65) Prior Publication Data

US 2014/0324607 A1    Oct. 30, 2014

Related U.S. Application Data

(60) Provisional application No. 61/780,370, filed on Mar. 13, 2013.

(51) Int. Cl.
| | |
|---|---|
| *G06Q 50/12* | (2012.01) |
| *G07F 17/00* | (2006.01) |
| *G06Q 30/06* | (2012.01) |
| *G09B 19/00* | (2006.01) |

(52) U.S. Cl.
CPC ......... *G06Q 30/0621* (2013.01); *G06Q 50/12* (2013.01)

(58) Field of Classification Search
CPC .. G06Q 50/12; G07F 17/0078; G09B 19/0092
See application file for complete search history.

(56) References Cited

U.S. PATENT DOCUMENTS

| | | | |
|---|---|---|---|
| 3,342,307 A | 9/1967 | Leach | |
| 3,456,578 A | 7/1969 | Pinsly | |
| 3,774,791 A | 11/1973 | Bornfleth | |
| 3,780,643 A | 12/1973 | Papai | |

(Continued)

FOREIGN PATENT DOCUMENTS

| | | | | |
|---|---|---|---|---|
| EP | 0296496 A | | 12/1988 | |
| WO | WO 9930257 | * | 6/1999 | ............. G06Q 10/08 |

(Continued)

*Primary Examiner* — Ig T An
(74) *Attorney, Agent, or Firm* — Harness, Dickey & Pierce, P.L.C.

(57) ABSTRACT

One variation of a method for personalizing food orders includes: from a patron, receiving a taste feedback for a first food item in a first food order submitted previously by the patron; predicting an absolute food preference of the patron from the first food order; predicting a relative taste preference of the patron based on the taste feedback and a recipe of the first food item; generating a taste profile of the patron based on the absolute food preference and the relative taste preference; from the patron, receiving a selection for a second food item in a new food order, the second food item different than the first food item; applying the taste profile of the patron to a recipe for the second food item to generate a personalized recipe; and submitting the personalized recipe with the new food order to a robotic food assembly apparatus.

22 Claims, 4 Drawing Sheets

(56) References Cited

U.S. PATENT DOCUMENTS

| | | |
|---|---|---|
| 3,887,964 A | 6/1975 | Richards |
| 4,246,462 A | 1/1981 | Meisel |
| 4,356,595 A | 11/1982 | Sandberg et al. |
| 4,513,656 A | 4/1985 | Fay |
| 4,567,819 A | 2/1986 | Adamson |
| 4,582,047 A | 4/1986 | Williams |
| 4,716,821 A | 1/1988 | Mally et al. |
| 4,723,614 A | 2/1988 | Lahti |
| 4,913,039 A | 4/1990 | Sutphen |
| 4,944,218 A | 7/1990 | Cresson |
| 4,949,629 A | 8/1990 | Leary et al. |
| 4,951,648 A | 8/1990 | Shukla et al. |
| 5,033,366 A | 7/1991 | Sullivan |
| 5,113,753 A | 5/1992 | Robinson |
| 5,113,754 A | 5/1992 | Robinson et al. |
| 5,115,731 A * | 5/1992 | Maitland ............ G07F 17/0078 222/370 |
| 5,184,538 A | 2/1993 | Ledet |
| 5,190,780 A | 3/1993 | Fehr et al. |
| 5,306,192 A | 4/1994 | Caveza et al. |
| 5,377,492 A | 1/1995 | Robertson et al. |
| 5,379,633 A | 1/1995 | Flisram et al. |
| 5,441,035 A | 8/1995 | Liang-Chieh |
| 5,520,520 A | 5/1996 | Nakamoto et al. |
| 5,540,943 A * | 7/1996 | Naramura ............... A21C 9/04 426/231 |
| 5,566,817 A | 10/1996 | Meeker |
| 5,826,496 A | 10/1998 | Jara |
| 5,921,096 A | 7/1999 | Warren |
| 6,032,574 A | 3/2000 | Brayton et al. |
| 6,095,322 A | 8/2000 | Buysman et al. |
| 6,323,462 B1 | 11/2001 | Strand |
| 6,370,513 B1 * | 4/2002 | Kolawa ................. G06Q 30/02 705/15 |
| 6,546,847 B2 | 4/2003 | Pilati et al. |
| 6,696,003 B2 | 2/2004 | Cediel et al. |
| 6,837,436 B2 | 1/2005 | Swartz et al. |
| 6,843,166 B1 | 1/2005 | Li |
| 6,915,734 B2 | 7/2005 | Torghele et al. |
| 7,063,263 B2 | 6/2006 | Swartz et al. |
| 7,160,566 B2 | 1/2007 | Fink et al. |
| 7,216,490 B2 | 5/2007 | Joshi |
| 7,220,944 B2 | 5/2007 | Miller et al. |
| 7,370,749 B2 | 5/2008 | Smith |
| 7,581,476 B2 | 9/2009 | Freudinger et al. |
| 7,600,459 B2 | 10/2009 | Bodey et al. |
| 7,682,227 B1 | 3/2010 | Bifulco |
| 7,828,237 B2 | 11/2010 | Griffith et al. |
| 8,011,914 B2 | 9/2011 | Taylor et al. |
| 8,145,854 B1 | 3/2012 | Lee |
| 8,190,483 B2 | 5/2012 | Woycik et al. |
| 8,276,505 B2 | 10/2012 | Buehler |
| 8,307,951 B2 | 11/2012 | Sus et al. |
| 8,429,026 B1 | 4/2013 | Kolawa et al. |
| 2003/0200848 A1 | 10/2003 | Kuchler |
| 2004/0045975 A1 * | 3/2004 | Leykin .................... G07F 9/105 221/150 R |
| 2004/0208961 A1 | 10/2004 | Reckert et al. |
| 2004/0238555 A1 * | 12/2004 | Parks ...................... G07F 9/105 221/80 |
| 2005/0034588 A1 | 2/2005 | Schone et al. |
| 2005/0051566 A1 | 3/2005 | Leykin et al. |
| 2005/0199135 A1 | 9/2005 | Nishinomiya et al. |
| 2006/0237477 A1 | 10/2006 | Gregg |
| 2007/0023505 A1 | 2/2007 | Norton et al. |
| 2007/0196540 A1 | 8/2007 | Kirksey et al. |
| 2007/0265935 A1 | 11/2007 | Woycik et al. |
| 2008/0187637 A1 | 8/2008 | Spiegel |
| 2008/0313046 A1 * | 12/2008 | Denenburg ............ G06Q 20/20 705/15 |
| 2009/0056562 A1 | 3/2009 | Julian et al. |
| 2009/0241481 A1 * | 10/2009 | Sus ........................ A47F 10/06 53/474 |
| 2011/0232440 A1 | 9/2011 | Weber |
| 2011/0256292 A1 | 10/2011 | Purgatorio et al. |
| 2012/0072311 A1 | 3/2012 | Khan |
| 2012/0078734 A1 | 3/2012 | Sus et al. |
| 2012/0179584 A1 | 7/2012 | Woycik et al. |
| 2013/0020330 A1 | 1/2013 | Luft et al. |
| 2013/0149679 A1 * | 6/2013 | Tokuda ............... G09B 19/0092 434/127 |

FOREIGN PATENT DOCUMENTS

| | | | |
|---|---|---|---|
| WO | WO 9930257 A1 * | 6/1999 | ............ G06Q 10/08 |
| WO | 9949277 A | 9/1999 | |

* cited by examiner

US 10,068,273 B2

METHOD FOR DELIVERING A CUSTOM SANDWICH TO A PATRON

CROSS-REFERENCE TO RELATED APPLICATIONS

This application claims the benefit of U.S. Provisional Application No. 61/780,370, filed on 13 Mar. 2013, which is incorporated in its entirety by this reference.

TECHNICAL FIELD

This invention relates generally to the field of food preparation, and more specifically to a new and useful method for delivering a custom sandwich to a patron in the field of food preparation.

BRIEF DESCRIPTION OF THE FIGURES

FIG. 6 is a flowchart representation of one application of the second method.

DESCRIPTION OF THE EMBODIMENTS

The following description of the embodiment of the invention is not intended to limit the invention to these embodiments, but rather to enable any person skilled in the art to make and use this invention.

Figure 1:
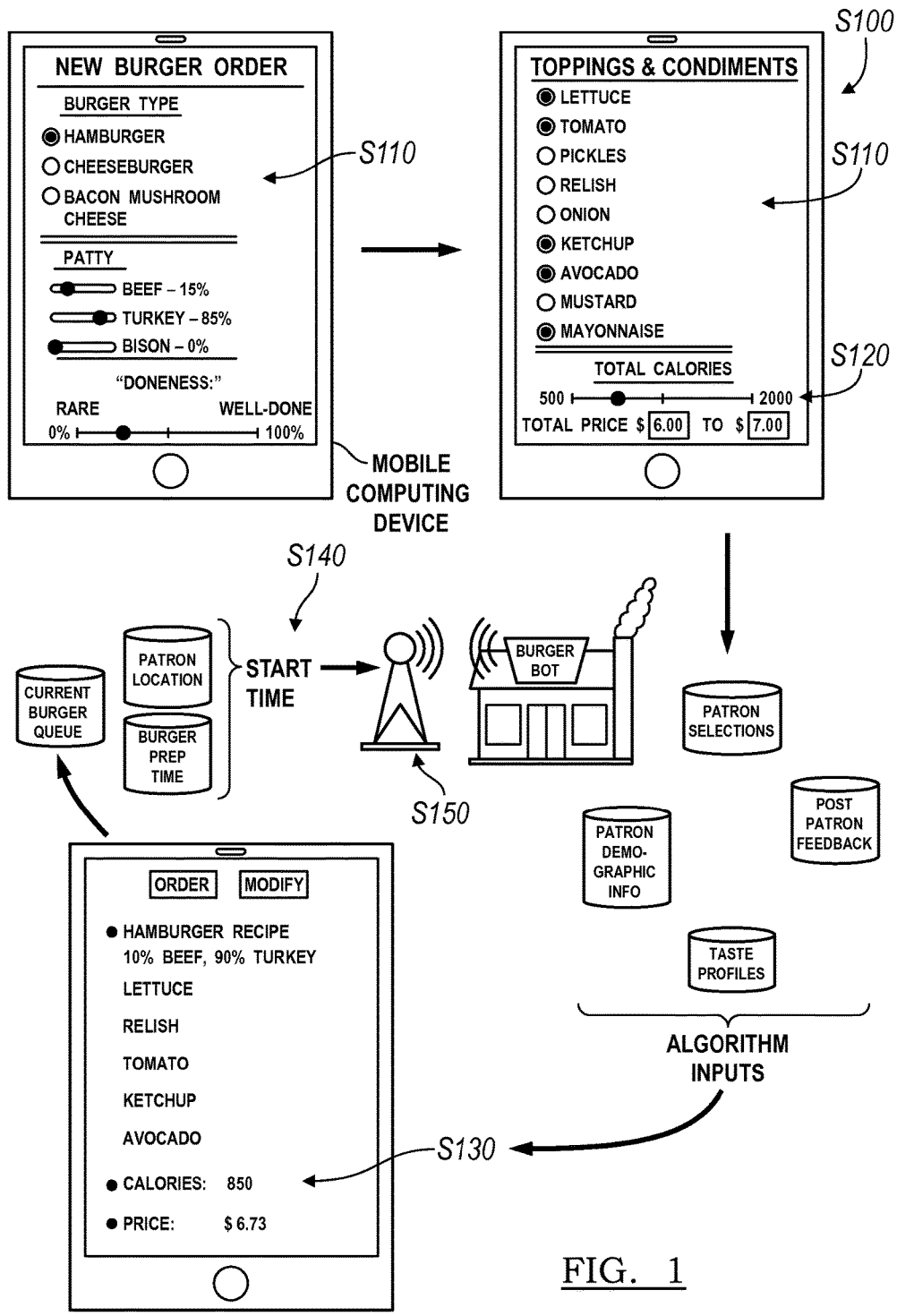
FIG. 1 is a flowchart representation of a first method of one embodiment of the invention.

As shown in FIG. 1, a method S100 for delivering a custom sandwich to a patron includes: receiving a selection for a sandwich type from a patron in Block S110; receiving, from the patron, a constraint related to the sandwich in Block S120; calculating a recipe and a cooking schedule for the sandwich based on the selected sandwich type and the constraint in Block S130; calculating a sandwich build start time based on a determined location of the user and the cooking schedule for the sandwich in Block S140; and submitting the recipe, the cooking schedule, and the sandwich build start time to a robotic sandwich assembly apparatus in Block S150.

The first method S100 functions to "optimize" flavor, timing, and a constraint for a food product according to various entered and derived factors related to a patron and to a patron's food order. From hereinafter, the first method S100 is described generally in the context of sandwiches and specifically in the context of burgers (e.g., hamburgers, cheeseburgers, veggie burgers). For example, the first method S100 can compromise a patron-elected constraint(s) (e.g., calories, nutritional content, price, or hunger level), a patron's taste preferences (e.g., based on patron feedback from a previous food order), and an order fulfillment time (e.g., based on a predicted time to complete the burger and a pickup preference of the patron) in order to generate and submit a food order to meet the patron's dietary needs. However, the first method S100 can also be applicable to any other assembled and/or prepared food such as salads, burritos, pizza, ice cream cones, banana splits, ice cream cookie sandwiches, hot dogs, deli sandwiches, falafel, gyros, layered cakes, tacos, crepes, waffles, pancakes, omelets, mixed (alcoholic or non-alcoholic) drinks, smoothies, etc.

In particular, the first method S100 functions to generate and submit a food order to a robotic sandwich assembly apparatus, such as described in U.S. Provisional Application No. 61/656,106, which was filed on 6 Jun. 2012 and which is incorporated herein in its entirety by this reference. The robotic sandwich assembly apparatus can incorporate various modules, components, sensors, control systems, etc. to enable precision fulfillment of custom burger orders, that is, accurate and repeatable assembly of burgers with custom combinations and quantities of available meats, buns, toppings, and condiments as specified through custom burger orders. For example, the robotic sandwich assembly apparatus can include a custom patty grinder that grinds fresh meats (e.g., beef, turkey, lamb, chicken, bison) and/or meat substitutes (e.g., soybeans, chickpeas, black beans) and stamps custom patties responsive to custom patty orders, such as an 8 oz. patty with 10% beef, 50% turkey, 40% bison for a first patron and a 5.5 oz. patty with 60% bison, 20% chicken, and 20% turkey for a second patron. The robotic sandwich assembly apparatus can also include a broiler or other type of patty cooker configured to cook each patty for a specific period of time and/or at a specific temperature to fulfill a custom patty "doneness" order. For example, the broiler can include a conveyor and burner for each of a general rare, medium, and well-done doneness setting, and the robotic sandwich assembly apparatus can control the speed and specific temperature of each conveyor to meet each specific doneness requirement for each burger that moves down the conveyor to cook. In another example, the broiler can include a wide, constant-speed conveyor and a series of burners that create a temperature differential across the width of the conveyor, wherein the custom patty grinder can dispense each patty at a particular location across the conveyor based on a respective doneness requirement. The robotic sandwich assembly apparatus can also include a topping dispenser and a condiment dispenser, as described in U.S. Provisional Application No. 61/656,106, configured to selectively slice and dispense fresh whole vegetables (e.g., lettuce, tomato, onion, pickle) and to selectively dispense specific quantities of condiments (e.g., mayonnaise, mustard, ketchup, relish) onto a bun. The robotic sandwich assembly apparatus can further include a bagging, boxing, or plating assembly configured to place a completed burger in a bag, in a box, on a plate, or in any other packaging for delivery to a patron. However, the robotic sandwich assembly apparatus can include any other components configured to independently or in cooperation enable precision fulfillment of custom burger orders.

Figure 2:
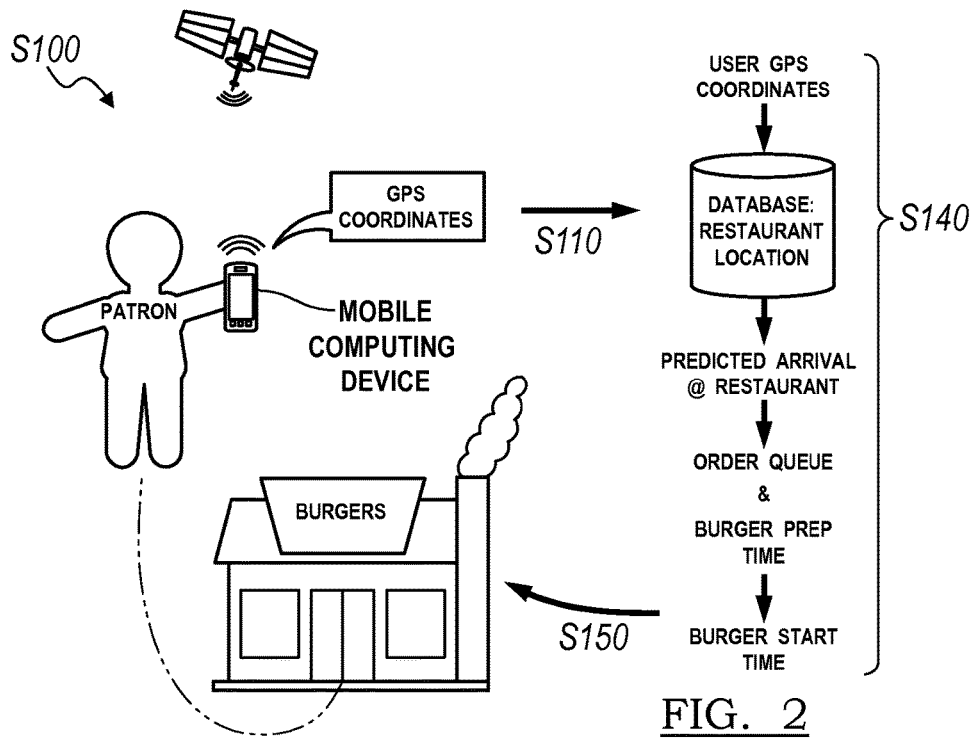
FIG. 2 is a flowchart representation of one variation of the first method.

As shown in FIGS. 1 and 2, Blocks of the first method S100 can be implemented on a mobile computing device, such as a smartphone or a tablet. Blocks of the first method S100 can thus receive order information, patron (GPS) location, payment information, patron feedback, etc. through a touchscreen or other user interface on the mobile computing device. A native sandwich-ordering application executing on the mobile computing device can further implement a sandwich algorithm to effectively compromise taste, nutrition, price, hunger level, time, and/or other parameters for each sandwich order entered by the patron, and the native application can further interface with a wireless communication module to transmit a custom sandwich order to the robotic sandwich assembly apparatus either directly or through a remote server in communication with the robotic sandwich assembly apparatus. Therefore, Blocks of the first method S100 can be implemented directly on a third-party electronic device (i.e., the patron's mobile computing device) in direct or indirect communication with the robotic sandwich assembly apparatus. In this implementation, the mobile computing device can store—or access from a remote database—past orders submitted by the patron, previous patron feedback, previous payment methods, previous receipts, a social networking profile of the patron, demographic information of the patron, the patron's location, tastes or preferences common to the patron's demographic or location, etc. The mobile computing device can also function as a feedback channel for the patron to submit feedback for the current burger order once the burger has been delivered, and the mobile computing device can store this feedback and/or communicate it to a remote database where it is stored in a personal taste profile of the patron and/or added to an aggregate taste profile for multiple patrons, such as in the same region or of a similar demographic.

Figure 3:
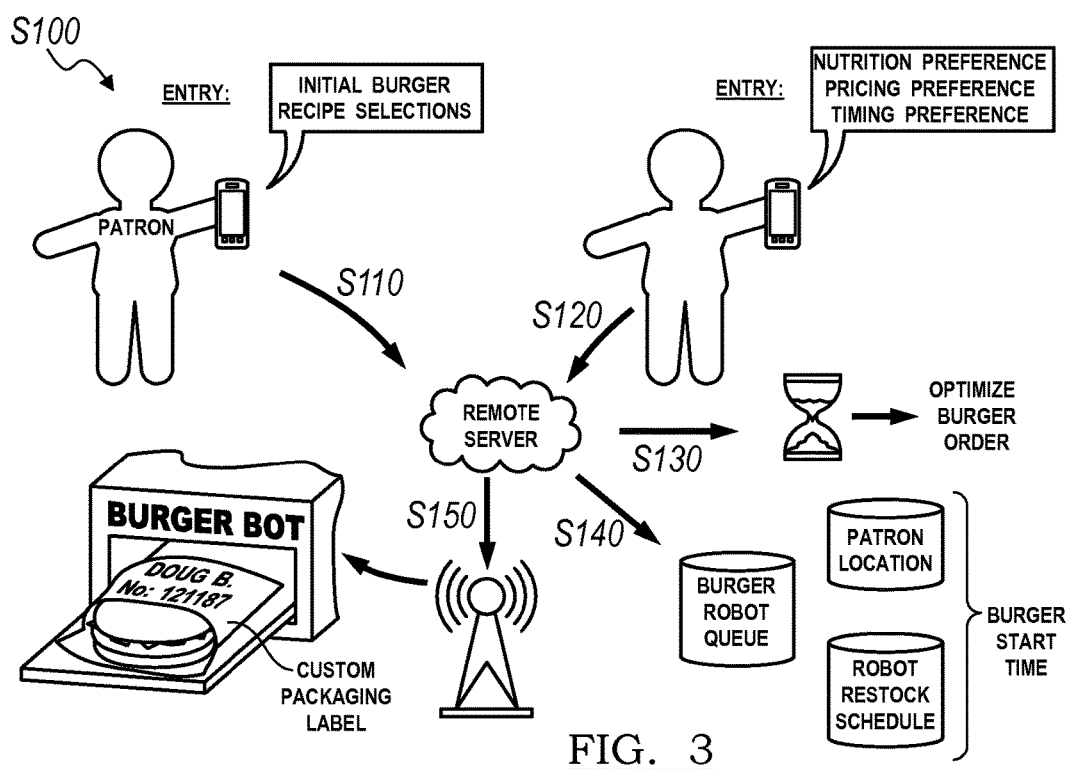
FIG. 3 is a flowchart representation of one variation of the first method.

Alternatively, as shown in FIG. 3, Blocks of the first method S100 can be implemented on a remote computer system, such as a remote server in communication with the robotic sandwich assembly apparatus (or a network of robotic sandwich assembly apparatuses) through an Internet or Ethernet connection. The computer system can be a cloud-based computer (e.g., Amazon EC2), a mainframe computer system, a grid-computer system, or any other suitable computer system. For example, the computer system can be a remote server that communicates with one or more robotic sandwich assembly apparatuses over HTTP (or TCP or UDP) protocols through a web service (e.g., Amazon AWS). The computer system can thus transmit patron, order, and/or order status data to and/or from robotic sandwich assembly apparatuses over an Ethernet, cellular, Wi-Fi, satellite, or other suitable connection.

Yet alternatively, Blocks of the first method S100 can be implemented by a user interface arranged on the robotic sandwich assembly apparatus or within a restaurant, café, or other establishment housing the robotic sandwich assembly apparatus. For example, the touchscreen can be installed on an external housing of the robotic sandwich assembly apparatus to receive ingredient selections from the patron and to display order information prior to submission to the robotic sandwich assembly apparatus. In another example, mobile computing devices can be arranged throughout the restaurant, etc., such as in tables or on walls, such that patrons can walk up to the mobile computing devices to build and submit custom burger orders. However, Blocks of the first method S100 can be implemented by any other device and in any other suitable way.

Block S110 of the first method S100 recites receiving a selection for a sandwich type from a patron. Generally, Block S110 functions to receive ingredient selections and sandwich preferences from the patron such that subsequent Blocks of the first method S100 can build and then submit a custom burger order to meet the patron's current appetite. Block S110 can also receive ingredient selections, in addition to the sandwich type selection, such as through a native application executing on a mobile computing device.

In one implementation, Block S110 receives a sandwich type selection from the patron. In one example, the patron opens a native custom burger application, initiates a new order, and selects a sandwich from a standard menu of sandwich types, such as including a plain hamburger, a cheeseburger, and a bacon and mushroom burger, as shown in FIG. 1. In another example, Block S110 filters the standard menu according to past orders submitted by the patron or perceived tastes of the patron in order to simplify the patron's selection, and the patron selects, through the native custom burger application, a type of sandwich from the limited menu. In yet another example, Block S110 receives data pertaining to "trending" custom burger orders from other patrons or common burger types selected by patrons in the same region or of a demographic similar to the patron and appends the standard menu or replaces items on the standard menu with the trending or common burger types, and the patron selects, through the native custom burger application, a type of sandwich from the modified menu. Block S110 can then retrieve the patron's selection entered into the native application.

Alternatively, Block S110 can receive a patty and bun selection from the patron. For example, the native application can display bun types (e.g., standard bun, extra-large bun, English muffin, lettuce wrap) adjacent corresponding radio buttons, and Block S110 can receive the patron's bun selection based on the state of each radio button. Block S110 can also receive a patty selection based on the state of each radio button adjacent a corresponding patty type (e.g., 100% lean beef, chicken breast, veggie burger). Alternatively and as described above, the native application can display meat types (e.g., beef, turkey, lamb, chicken, bison) adjacent linked sliders corresponding to a percentage or weight of each meat type in the patty, and Block S110 can receive a percentage or weight of each type of meat to grind for the custom patty based on the position of each slider, as shown in FIG. 1.

As shown in FIG. 1, Block S110 can further receive topping and condiment selections from the patron though the native application. For example, the native application can display a list of available toppings and condiments (e.g., cheese, tomato, lettuce, onion, mushroom, fried egg, mayonnaise, ketchup, mustard, relish, pickle, pepper, salt, BBQ sauce, jalapeños, sprouts) with corresponding adjacent radio buttons, and Block S110 can receive the patron's ingredient selection based on the state of each radio button. In another example, the native application can display the list of available toppings and condiments with corresponding adjacent sliders, each slider specifying a range, such as "none to a lot" (e.g., for ketchup or pepper) "none to 2 oz.," (e.g., for lettuce) or "none to 2 tsp." (e.g., for mayonnaise). In this example, Block S110 can receive the patron's preference for exclusion or inclusion of various ingredients as well as a preferred amount of each ingredient.

Block S110 can further control the menu of burger types, bun types, patty types, meats, toppings, and/or condiments presented to the patron for selection within the native application. For example, Block S110 can receive the patron's location from the patron's mobile computing device (e.g., GPS coordinates), identify a nearest robotic sandwich assembly apparatus, and poll the robotic sandwich assembly apparatus for buns, patties, meat, toppings, condiments, and/or other ingredients loaded into the robotic sandwich assembly apparatus and currently available. Block S110 can further access current orders and/or predicted incoming order ingredients to predict ingredient availability when the patron's order is queued to the robotic sandwich assembly apparatus. Block S110 can subsequently adjust ingredient lists displayed to the patron through the native application such that the patron has a substantially complete list of available ingredients that also excludes items not available from the target (i.e., local) robotic sandwich assembly apparatus.

Additionally or alternatively, Block S110 can automatically select all or a portion of the ingredients in the patron's new order. In one implementation, in response to an "I'm hungry," "I want a burger," or other input by the patron into the native application, Block S110 accesses a past burger order by the patron and modifies (e.g., adjusts ingredient quantities and doneness specifications) the past order according to the patron's order feedback in order to generate a selection of burger ingredients and preferences that better meets the patrons taste, nutritional, and/or other preferences. In another implementation, Block S110 accesses past patron orders, past patron order feedback, a time of day, a recent social networking communication or post, patron trends or habits, patron demographic and location, and/or any other patron or order information to generate a selection of burger ingredients and preferences particular to the patron at the particular time. In this implementation, Block S110 can thus implement a burger recommendation service to recommend particular burger ingredients and/or preferences to meet a patron's current dietary needs.

Block S120 of the first method S100 recites receiving, from the patron, a constraint related to the sandwich. Generally, Block S120 functions to receive a nutritional preference, a hunger level, a pricing preference, a timing, or another constraint from the patron such that Blocks S130 and S140 can generate a burger recipe and burger schedule that effectively compromises the patron's current hunger level, dietary needs, tastes, and burger and timing preferences. In one example, Block S120 can receive a preference for a total number of calories in the burger based on the position of a calorie slider bar set by the patron through the native application, as shown in FIG. 1. Similarly, Block S120 can receive a preference for a range of calories in the burger based on the state of a radio button with a labeled calorie range (e.g., 600-700 calories, 700-800 calories, etc.) set by the patron through the native application. Block S120 can additionally or alternatively receive a selection for a quantity (e.g., weight) of vegetables, a number of grams of carbohydrates or fat, a "greasiness," a weight or calorie ratio of vegetables to meat, or other nutritional preference through one or more radio buttons, slider bars, or other input regions displayed on the mobile computing device and set by the patron through the native application.

Block S120 can also receive a hunger level of the patron. For example, Block S120 can receive the patron's hunger level based on the position of a slider bar with extremes labeled "feels more like snack time" and "better make it a horse," the slider bar is displayed on the patron's mobile computing device and set by the patron through the native application. In this example, Block S120 can normalize the relative (i.e., non-scientific) hunger level selection based on previous patron order sizes and associated patron feedback to estimate an actual volume or weight of the burger necessary to satiate the patron. Alternatively, in a similar example, the slider bar can include sandwich weight, volume, or mass labels such that Block S120 can directly access data indicating a weight, volume, or mass of the burger necessary to satiate the patron.

Block S120 can also receiving a burger or meal pricing preference, such as based on a patron-selected position of a slider bar associated with price. However, Block S120 can receive any other suitable patron-elected constraint.

Block S130 of the first method S100 recites calculating a recipe and a cooking schedule for the sandwich based on the selected nutritional content. Generally, Block S130 functions to combine selected ingredients, sandwich preferences, nutrition preferences, and hunger level into a sandwich order specifying specific quantities of particular ingredients and a specific cooking schedule that substantially effectively compromises order details provided by the patron.

As shown in FIGS. 1 and 2, Block S130 can implement an algorithm that selectively adjusts the quantity of particular ingredients and/or cooking schedules to generate the custom burger order. The algorithm can receive as inputs feedback from the patron and other customers in response to fulfilled burger orders, patron nutrition selection and/or hunger level, selected ingredients and/or ingredient quantities, patty doneness, degree of bun toasting, and/or other entered, collected, and/or extrapolated burger-related data pertaining to past burger orders and the current burger order. By weighting the various inputs, such as each ingredient selection and initial quantity, Block S130 can adjust how much of each ingredient is added to the burger and how the burger is cooked to "optimize" flavor, nutrition, and meal size for the patron. For example, Block S130 specifies an amount of meat by $\frac{1}{4}$ oz., the amount of tomato by slice of predetermined thickness, amount of table salt to the tens of milligrams, toasted bun to a percentage brownness, temperature of the patty to a single degree Fahrenheit, temperature gradient of the patty through its thickness, percentage meat composition of the patty, patty cook time to a second, etc., all of which can be implemented by the robotic sandwich assembly apparatus to precisely (i.e., accurately and repeatably) build a burger of substantially exacting weight, content, and nutrition (e.g., calories, grams of fat, sodium). Block S130 can also select the algorithm, from a set of algorithms, that is particularly relevant to the patron, such as an algorithm generated through feedback from patrons with tastes, location, and/or demographic similar to that of the patron. Alternatively, Block S130 can select the algorithm that is specific to the patron and refined over time as the patron submits additional burger orders and supplies corresponding feedback. However, Block S130 can implement a unique, common, default, or other algorithm to calculate the recipe and the cooking schedule for the burger.

Block S130 (and the algorithm) can account for the configuration of the robotic sandwich assembly apparatus and ingredients currently loaded to the robotic sandwich assembly apparatus (as described above). For example, the robotic sandwich assembly apparatus can include a topping dispenser as described in U.S. Provisional Application No. 61/656,106, wherein operation of the topping dispenser yields a topping (e.g., tomato, pickle, onion) slice of a particular thickness determined by a position of a respective slicing blade. In this example, Block S130 accounts for a step-like function of topping quantity, wherein each operation of the topping dispenser deposits a particular amount (or particular range of) topping onto the burger. In another example, the configuration of the condiment (e.g., ketchup) dispenser in the robotic sandwich assembly apparatus can enable application of a continuum of quantities of condiment onto the burger, such as no ketchup up to the current total volume of ketchup in a ketchup container loaded into the robotic sandwich assembly apparatus. In this example, Block S130 can also account for a viscosity of a condiment, a size of the bun or patty, and/or other ingredients on which the condiment is dispensed to set an upper limit on the amount of condiment that can be dispensed. In this example, Block S130 can scale the upper limit on applied condiment volume linearly with patty weight, and, for any given order, set the upper limit on applied relish volume (relatively high viscosity) higher than the upper limit on applied aioli volume (relatively low viscosity). In another example, the robotic sandwich assembly apparatus is configured to grind fresh meats into custom patties and press patties between $\frac{1}{2}$ oz. and 16 oz. in size. In this example, the resolution of the meat grind for each meat type can be ±5%, and Block S130 can thus set a continuum of patty weights between 3 oz. and 16 oz. with custom meat grinds including between 10% and 100% of the available meats (e.g., 100% beef, or 10% beef, 15% buffalo, 75% turkey) for the robotic sandwich assembly apparatus.

In one implementation, Block S130 calculates initial burger nutrition (e.g., calories, grams of fat, vitamin B) from the ingredient selections, ingredient quantities, and cooking preferences (e.g., doneness) received from the patron and/or generated in Block S110. Block S130 then compares the initial burger nutrition to the nutrition setting received in Block S120. Block S130 can also calculate an initial size of the burger based on patron-entered or generated burger settings and then compare the initial burger size with the hunger level received in Block S120. If either of the foregoing comparisons indicate that misalignment between flavor and nutrition preferences and/or between burger size and hunger preferences, Block S130 can implement the foregoing algorithm to adjust the ingredient selections, ingredient quantities, and/or cooking preferences to reduce (i.e., optimize) the misalignment.

In one example, Block S110 can receive GPS coordinates of a mobile computing device used by the patron to submit an ingredient selection and burger preferences, and Block S130 can access customer feedback data in the patron's location or region to determine that customers in the patron's location are typically not able to taste less than 1 tsp of mayonnaise, and are sensitive to between 1 and 2 tsp of mayonnaise, and either can't discern more than 2 tsp of mayonnaise or think that more than 2 tsp of mayonnaise is too much. Thus, when Block S110 receives a selection for mayonnaise from the patron, Block S130 can set an upper and lower mayonnaise volume of 1 tsp and 2 tsp, respectively. Furthermore, Block S130 can determine that the patron's preferred burger (or total meal) calorie content is less than a predicted total number of calories for the burger (or meal) with the patron's selected ingredients and ingredient quantities. In response, Block S130 can reduce the amount of mayonnaise to apply to the burger from an average of 1.5 tsp to 1sp and, if this does not suffice in reducing the total burger (or meal) calories, Block S130 can increase patty cook time (i.e., doneness) to reduce the grease (and calorie from fat content) of the burger. Furthermore, if the adjusted patty doneness (related to cooking time and temperate) approaches a boundary of patty doneness and the total burger calorie content is still excessive, Block S130 can reduce the total weight of the patty and/or replace a percentage of beef in the patty with a corresponding percentage of turkey, chicken, soybeans, and/or chickpeas. For example, if the patron specifies 20% done, Block S130 can set an upper limit of 30% doneness to meet the patron's nutritional preferences without substantially sacrificing the taste of the burger, which can be based on previous feedback from the patron, feedback from other customers in the patron's area, and/or feedback from other customers of a demographic or tastes similar to that of the patron. Similarly, if the patron specifies 50% beef, Block S130 can set a lower limit of 40% beef to meat the patron's nutritional preferences without substantially sacrificing taste. Additionally or alternatively, Block S130 can proportionally (e.g., linearly, exponentially) reduce mayonnaise amount, increase cook time, and/or adjust patty content.

In another example, prior feedback from the patron suggests that the patron has a strong liking for tomato and lettuce, though he exhibits a slight preference for lettuce over tomato. Furthermore, prior feedback suggests that the patron is particularly sensitive to doneness, and Block S130 can thus set a threshold change in patron-selected patty doneness to 5% rather than 10%, which is standard for customers with less sensitivity to doneness. As in the previous example, Block S130 can determine that the patron's total burger calorie selection is less than a predicted total number of calories for the burger with the patron's selected ingredients and ingredient quantities. In response, rather than increasing patty doneness, Block S130 can reduce patty size and replace a lost patty weight (before or after cooking) with lettuce and tomato at 1.3:1 ratio of lettuce to tomato based on the patron's slight preference for lettuce in order to meet the patron's taste preferences received in Block S110 and nutrition preference and hunger level received in Block S120.

In yet another example, Block S120 receives a price preference from the patron, such as a maximum burger price (e.g., $7.00) or a preferred burger price range (e.g., $5.00-$5.99), and Block S130 calculates a total burger price based on selected ingredients and ingredient quantities and compares this price to the patrons preferred price. If the total burger price exceeds the patron's price preference, Block S130 can selectively reduce the quantity of certain ingredients. For example, if beef is the most expensive meat in the robotic sandwich assembly apparatus and the patron has selected a 100% beef patty, Block S130 can replace a percentage of beef in the patty with a less expensive meat, such as turkey. This may also complement a requirement to reduce a total caloric content of the burger. Block S130 can additionally or alternatively reduce the size of the patty and replace the reduced weight of the burger with a vegetable that is less expensive by weight than cooked meat. However, Block S130 can calculate the burger recipe and specify the cooking schedule for the burger in any other way, according to any other schema or algorithm, and based any other patron-related data.

Block S130 can further include displaying the "optimized" burger recipe to the patron on the mobile computing device. For example, Block S130 can include displaying, on a touchscreen of the mobile computing device, the quantity of each specified ingredient in the burger, the total nutritional content of the burger, the specified doneness of the patty, the toast level of the bun, the price of the burger, and/or any other relevant order information. Block S130 can further enable the patron to modify the recipe and/or cooking schedule, such as with radio buttons or slider bars, and further update in real time the nutritional content, size or weight, and/or price of the burger in response to patron modifications. Block S130 can record changes to the "optimized" recipe for application to future orders by the patron.

Block S130 can further prompt the patron to submit payment information, such as by entering credit or debit card information, swiping or capturing an image of a credit or debit card, linking to an electronic payment profile or checking account, submitting electronic or tangible gift card information, or selecting a payment source from a previous transaction. Block S130 can therefore also receive and/or authenticate a payment from the patron, and the payment can cover the price of the burger as well as any side, drink, desert, or other food item. Additionally or alternatively, Block S130 can guide the user to make a payment at the restaurant, through the robotic sandwich assembly apparatus, or in any other way prior to receiving the burger. However, Block S130 can implement any other suitable or pertinent functionality.

Block S140 of the first method S100 recites calculating a sandwich build start time based on a determined location of the patron and the cooking schedule for the sandwich. Generally, Block S140 functions to specify a sandwich build start time such that the sandwich may be assembled, packaged, and readied for the patron at or by a particular time. Block S140 can estimate the time required to fulfill the order (e.g., to a second) based on any one or more of a patty grind and press time (e.g., based on patty size), broil time (e.g., based on a specified patty doneness), bun toast time, selected toppings and condiments and specified topping and condiment quantities, known burger-component transfer times (e.g., between broiler and topping stations), etc.

Block S140 also functions to determine the patron's location and to estimate a pickup time for the burger order based on the patron's location. For example, Block S140 can interface with the patron's mobile computing device to determine the patron's location, such as by receiving GPS coordinates from a GPS sensor integrated into the mobile computing device, triangulating the patron's position based on communication with local cellular towers, or identifying a local wireless router in communication with the mobile computing device. In an example implementation, Block S140 can determine that the patron is currently occupying the restaurant housing the robotic sandwich assembly apparatus and thus estimates the preferred pickup time to be as soon as possible. In another example implementation, Block S140 determines that the patron is outside the restaurant, such as several city blocks from the restaurant. In this example implementation, Block S140 can compare subsequent locations of the patron (based on time) to determine if the patron is walking, driving, or riding a bus to the restaurant. Based on an estimated speed and/or predicted local traffic, Block S140 can predict when the patron will arrive at the restaurant and estimate the preferred pickup time accordingly. Alternatively, Block S140 can receive a preferred pickup time entered into the native application by the patron explicitly, though Block S140 can function in any other way to determine the location of the patron and estimate a preferred order pickup time.

Block S140 can also predict a preferred order completion time based on patron preferences and/or past patron feedback. In one example, Block S140 can determine that the patron prefers piping-hot burgers based on past feedback suggesting that his burger was too cold. Based on this feedback, Block S140 can set the preferred order completion time as not before the patron enters the restaurant (and is ready to receive the burger). In a similar example, Block S140 can determine that the patron prefers cooled burgers (e.g., cooled for five minutes after completion) based on past feedback suggesting that his burger was too hot. Based on this feedback, Block S140 can set the preferred order completion time as between four and five minutes prior to the patron entering the restaurant.

As shown in FIG. 3, Block S140 can further access data pertaining to current orders in an order queue of the robotic sandwich assembly apparatus. For example, Block S140 can access estimated completion times for each order, specified order completion times relative to preferred order pickup times, and ingredients allocated for each order. Based on this data, Block S140 can also estimate restocking times for various ingredients and/or update a restocking schedule to maintain an adequate supply of ingredients to fulfill orders in the queue.

Based on the foregoing information, including the order completion time, the estimate arrival time of the patron, the preferred order completion time, the current robotic sandwich assembly apparatus queue, an ingredient restocking schedule, etc., Block S140 can thus specify an order start time substantially likely to fulfill order, patron, and robotic sandwich assembly apparatus requirements.

Alternatively, Block S140 can specify the order start time that simply indicates that the order is to be added sequentially to the current queue. Block S140 can also specify the order start time that withholds the order from the queue until all other orders in the patron's party have been submitted such that members of the patron's party can receive their orders together (sequentially and uninterrupted). Block S140 can further prioritize the patron's order, such as based on a reward program subscribed to by the patron, by bumping the patron's order forward in the queue. However, Block S140 can function in any other way to specify a start time for the burger.

Block S150 of the first method S100 recites submitting the recipe, the cooking schedule, and the sandwich build start time to a robotic sandwich assembly apparatus. Generally, once the cooking recipe and schedule is accepted by the patron in Block S130 and the start time for the burger is specified in Block S140, Block S150 functions to upload order-related data to the robotic sandwich assembly apparatus to fulfill the customized burger order at or by the specified delivery time. As described above, the recipe and cooking schedule can be transmitted from the patron's mobile computing device directly to the robotic sandwich assembly apparatus or indirectly routed via a remote network. Various Blocks of the first method S100 can alternatively be implemented on the remote server, which can transmit order-related data directly or indirectly to the robotic sandwich assembly apparatus, such as over the Internet or other network. Once the order is submitted to the robotic sandwich assembly apparatus, the robotic sandwich assembly apparatus can implement the order by assembling and cooking the burger according to the recipe and schedule.

Block S150 can further include tracking the patron's burger order as the burger is assembled in the robotic sandwich assembly apparatus. For example, Block S150 can interface with the robotic sandwich assembly apparatus to identify a current stage of the burger, such as meat-grinding, patty-pressing, broiling, bun toasting, topping addition, condiment addition, bagging, and ready-for-pickup. At each stage, Block S150 can notify the patron of his burger's status, such as by pushing a notification to the patron's mobile computing device. For example, Block S150 can push notifications that recite "Patty press complete; beginning broil" and then "Tomatoes added; moving to pickles" to the patron's mobile computing device substantially in real time. In this implementation, Block S150 can further enable the patron to make last-minute changes to his order before each schedule (e.g., patty doneness) or ingredient order is realized. For example, upon receiving the "Tomatoes added; moving to pickles" notification, the patron can access the burger order through the native application executing on the mobile computing device and remove pickles from the order, and Block S150 can receive the change and update the order accordingly.

As shown in FIG. 3, Block S150 can further specify a packaging label for the order. For example, when the burger is completed, the robotic sandwich assembly apparatus can place the burger in a bag or in a box. Block S150 can thus set information to be etched or printed on the bag, on the box, or on a sticker automatically applied to the bag or box. For example, Block S150 can specify any one or more of the patron's name, nickname, or username, a custom burger name set by the patron (e.g., "The Fat Jared," the "Feelin'

Chubs Today But Dying For A Burger," or the "Vegans Eat Burgers Too"), a list of ingredients and/or ingredient quantities, a cooking schedule or patty doneness, nutritional content in a 'Daily Value' table, a total number of calories, a number of likes submitted by friends of the patron through a social networking system in response to a post to the social networking system of the patron's order, and/or any other suitable or relevant information. However, Block S150 can function in any other way to submit the recipe, the cooking schedule, and the sandwich build start time to the robotic sandwich assembly apparatus.

The first method S100 can further interface with one or more optical sensors (i.e., one or more digital cameras) arranged within the robotic sandwich assembly apparatus to transmit an image of the patron's burger during assembly. For example, the first method S100 can transmit a live video feed of the patron's burger to the patron's mobile computing device, such as through a native sandwich-ordering application executing on the mobile computing device. In this example, the live video feed can images of the patty cooking in the broiler, the bun toasting in a toaster, application of selected toppings and condiments, and final packaging of the completed burger. The live video feed can also include an augmented reality overlay, such as a dot or other marker indicating the specific patty, bun, etc. that belongs to the patron's burger, such as for images that depict multiple buns or patties. The augmented reality overlay can also show the temperature of the patty (e.g., as measured by a laser-type contactless temperature sensor arranged within the robotic sandwich assembly apparatus) as the patty moves through the broiler, the weight of each topping and/or condiment added to the burger, the time remaining to complete the burger order, completed and/or remaining steps in the burger order, or any other relevant information. The first method S100 can thus enable the patron to view and monitor assembly of his burger substantially in real time. The first method S100 can also enable the user to make last-minute changes to his order, such as before his burger enters a particular module within the robotic sandwich assembly apparatus. For example, the first method S100 can enable the user to adjust the doneness of the patty before the patty enters the broiler, can enable the user to change the topping selection for the burger before the burger and bottom bun enter the topping slicer, and can enable the user to change the condiment selection for the burger before the burger, bottom bun, and toppings enter the condiment dispenser. The first method S100 can thus provide the patron with real-time burger assembly feedback through the live video feed and enable last-minute order changes based on current burger assembly progress.

2. Second Method and Applications

Figure 4:
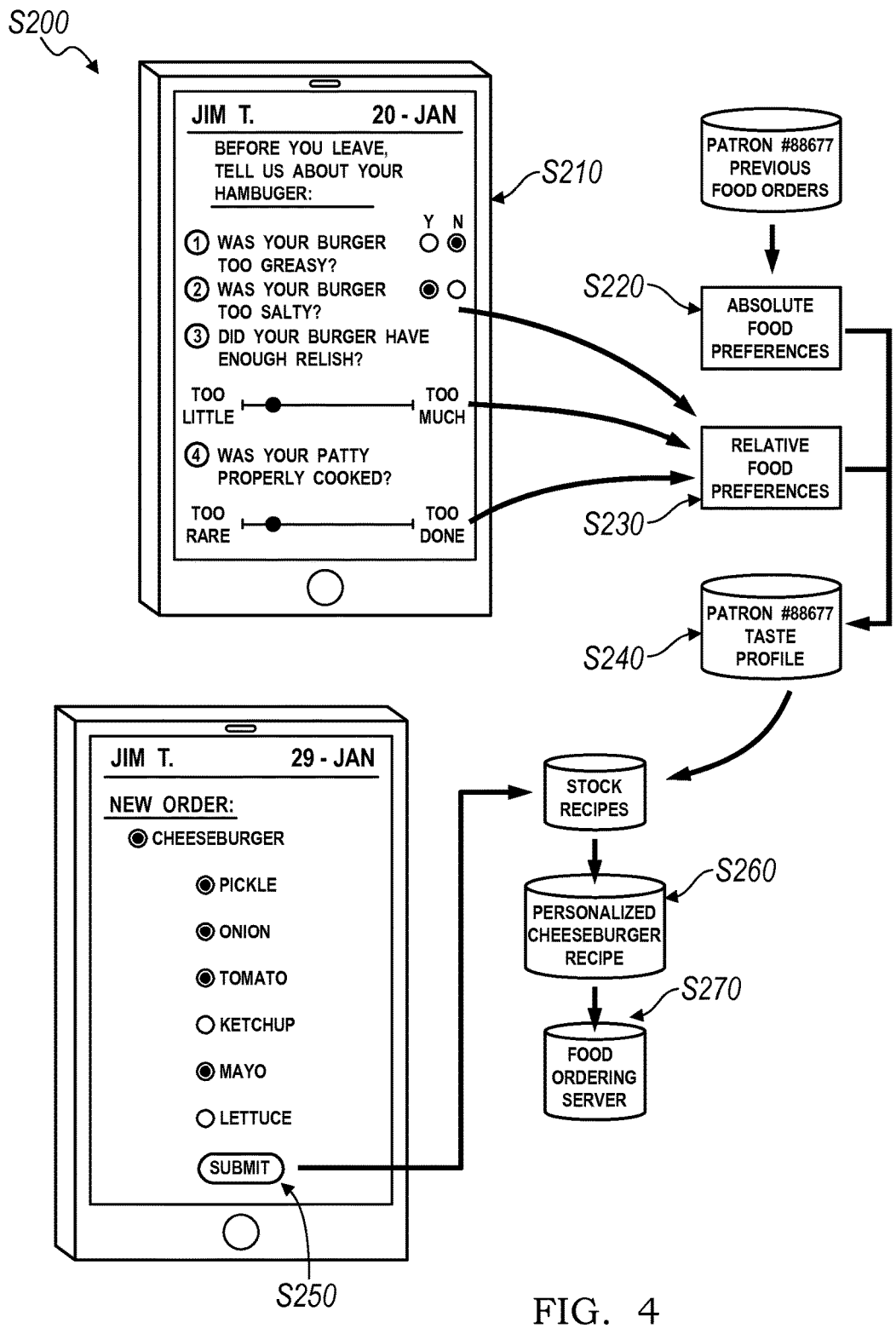
FIG. 4 is a flowchart representation of a second method of one embodiment of the invention.

As shown in FIG. 4, a method S200 for personalizing food orders includes: from a patron, receiving a taste feedback for a first food item in a first food order submitted previously by the patron in Block S210; predicting an absolute food preference of the patron from the first food order in Block S220; predicting a relative taste preference of the patron based on the taste feedback and a recipe of the first food item in Block S230; generating a taste profile of the patron based on the absolute food preference and the relative taste preference in Block S240; from the patron, receiving a selection for a second food item in a new food order in Block S250, the second food item different than the first food item; applying the taste profile of the patron to a recipe for the second food item to generate a personalized recipe in Block S260; and submitting the personalized recipe with the new food order to a robotic food assembly apparatus in Block S270.

As shown in FIG. 4, one variation of the second method S200 includes: identifying an absolute food preference of a patron from a trend within a set of food orders previously submitted by the patron in Block S220; identifying a relative taste preference of the patron from the set of food orders in Block S230; generating a taste profile of the patron based on the absolute food preference and the relative taste preference in Block S240; from the patron, receiving a selection for a new food item in a new food order in Block S250, the new food item unique to the set of food items; applying the taste profile of the patron to a stock recipe for the new food item to generate a personalized recipe in Block S260; and submitting the personalized recipe with the new food order to a food ordering system in Block S270.

Figure 5:
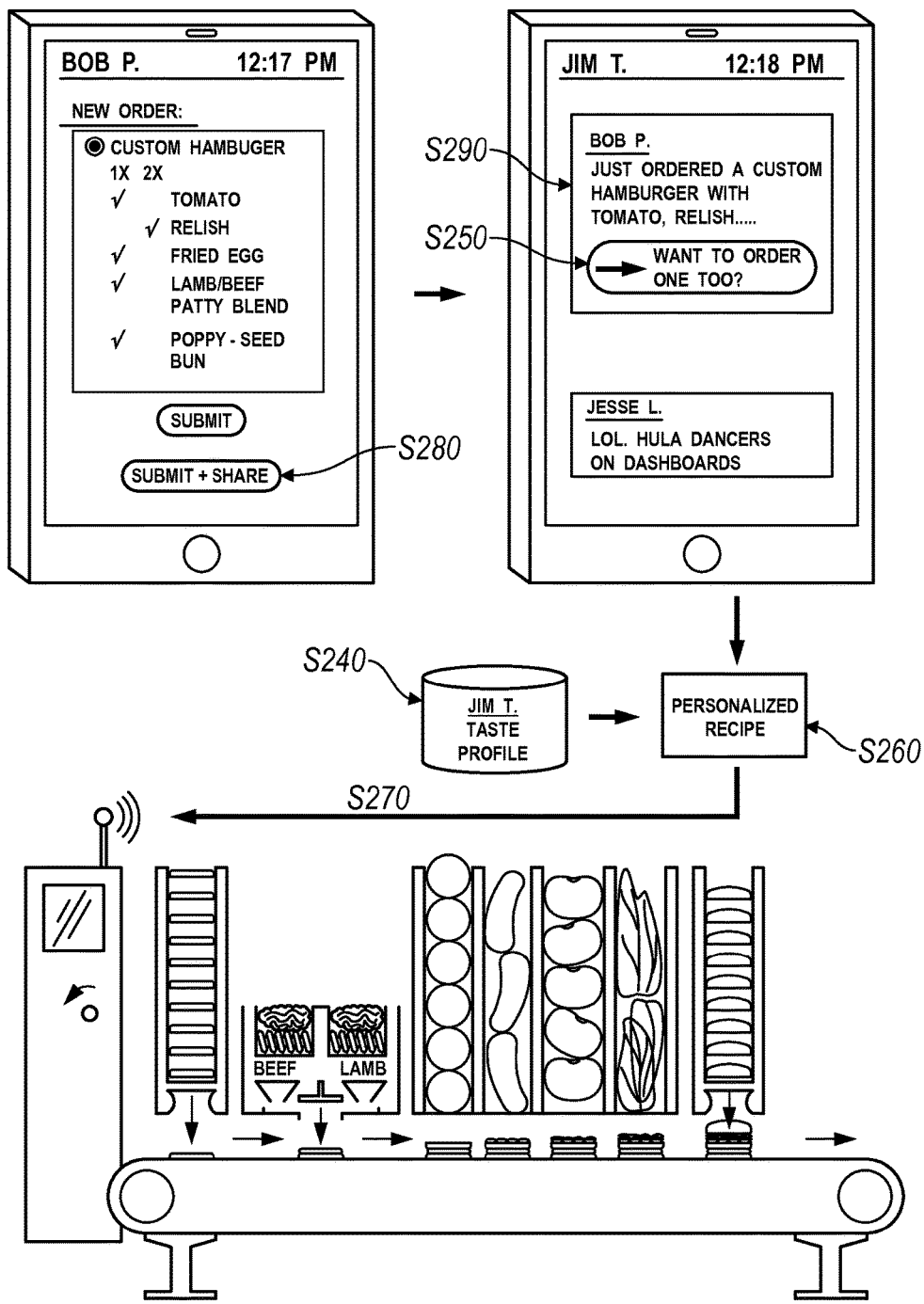
FIG. 5 is a flowchart representation of one variation of the second method.

As shown in FIG. 5, one application of the second method S200 includes: from a first patron, receiving a first order for a custom food item in Block S280; in response to authorization by the first patron, sharing the custom order with a second patron in Block S290; from a second patron, receiving a selection for a duplicate of the custom food item in a second food order in Block S250; retrieving a taste profile for the second patron in Block S240, the taste profile defining an absolute food preference and a relative taste preference associated with the second patron; applying the taste profile to a recipe for the custom food item to generate a personalized recipe for the second food order in Block S260; and submitting the personalized recipe with the second food order to a food ordering system in Block S270.

Generally, the second method S200 functions to aggregate order history of and/or order feedback submitted by a patron to one or more food establishments (e.g., a restaurant, a food ordering system, a robotic sandwich assembly apparatus, etc.) into a taste profile specific to the patron and defining preferences for types and quantities of ingredients applicable to a variety of food items, and the second method S200 then applies the patron's taste profile to a new food item selected by the patron in a new food order to automatically personalize the food item for the patron. In particular, the second method S200 amasses types of food items ordered by the patron, ingredients added and/or removed from the food items by the patron, and/or feedback submitted by the patron in response to fulfillment of the food items into a taste profile that defines absolute taste preferences—such as whether or not to include an ingredient in a future food item ordered by the patron—and relative taste preferences—such as how much of an ingredient to include in the future food item relative to a stock (i.e., preset, predefined) recipe for the future food item. Then, during or following construction of a new food order including a new food item, the second method S200 automatically applies the patron's taste profile to the new food item by editing the recipe for the food item to reflect the absolute and relative taste preferences of the patron as defined in the patron's taste profile.

The second method S200 therefore functions to personalize food items for a patron, such as standard menu items or custom menu items customized by the patron or an other patron, to substantially ensure that any food item ordered by the patron will be palatable, satisfactory, if not much enjoyed by the patron. As above, from hereinafter, the second method S200 is described generally in the context of sandwiches and specifically in the context of burgers (e.g., hamburgers, cheeseburgers, veggie burgers).

In one example, the second method S200 generates and implements a patron's taste profile that is specific to hamburgers. In this example, as the patron frequents a hamburger joint (e.g., a hamburger joint housing a robotic sandwich assembly apparatus as described above) over time, the second method S200 collects data on types of hamburgers selected by the patron, such as plain hamburgers, veggie burgers, cheddar cheese and mushroom burgers, avocado and tomato burgers, etc. and extrapolates a preference for a "type" of burger (e.g., greasy, fresh, loaded with toppings, vegetarian, etc.) preferred by the patron as trends (or patron habits) become apparent in the patron's order history. The second method S200 also collects data on selections for ingredients to add to and to remove from standard hamburgers (e.g., addition of pickles and removal of tomatoes), selections for patty doneness (e.g., rare, well-done), selections for hamburger size (e.g., ⅓ lb., ½ lb., ¾ lb.), and/or selections for total hamburger (or meal) calories, etc. submitted by the patron in previous food orders for hamburgers. The second method S200 additionally or alternatively collects patron feedback on hamburgers provided in fulfilled food orders, such as qualitative feedback reciting "too salty," "perfect amount of mustard," "not quite enough food," "patty too dry," "perfect toast on the bun," and/or "burger was a little too wet." The second method S200 then assembles these data into a taste profile for the patron—or updates the patron's existing taste profile—that specifies one or more flavor profiles preferred by the patron (e.g., sweet, savory, light, greasy, meaty, vegetarian, etc.), absolutely preferences for which ingredients to include and which to exclude from personalized hamburger recipes for the patron, how much to cook a patty and toast a bun, and how much salt, pepper, mustard, ketchup, tomato, relish, onion, lettuce, and/or pickle, etc. to load onto a burger. Then, when the patron initiates a new food order for a new hamburger that was not previously ordered by the patron, the second method S200 can apply the patron's taste profile to a recipe for the new hamburger to align the preparation method and ingredients in the new hamburger with the patron's taste preferences. Similarly, when the patron initiates a new food order for a same hamburger specified in a previously order by the patron, the second method S200 can personalize a recipe for the hamburger with the patron's taste profile to match the flavor of the hamburger to that which was ordered previously by the patron, or the second method S200 can adjust the recipe for the hamburger according to the patron's taste profile to better match the patron's taste preferences over the hamburger that which was previously delivered to the patron.

In the application described above, the second method S200 can further function to share details of a custom food item submitted by a first patron with a second patron such that the second patron can order the same custom food item as the first patron. The second method S200 can then apply the taste profile of the second patron to the second patron's order for the custom food item to personalize the custom food item. In particular, in this application, the second method S200 can implement the second patron's taste profile to align a recipe for a custom food item with preparation and ingredient type and quantity preferences of the second patron, thereby substantially ensuring that the custom food item ordered by the first patron and copied into an order by the second patron will be palatable, satisfactory, if not much enjoyed by the second patron.

2.1 Taste Feedback

Block S210 of the second method S200 recites, from a patron, receiving a taste feedback for a first food item in a first food order submitted previously by the patron. Generally, Block S210 functions to collect data pertaining to the patron's palate (i.e., tastes) and to pass these data to Block S220 and Block S230 for extrapolation of absolute and relative taste preferences that are aggregated into the patron's taste profile in Block S240. Block S210 can thus collect taste feedback for one or more food items previously ordered by the patron, and subsequent Blocks of the second method S200 can cooperate to apply a corresponding taste profile of the patron to a food item never before ordered by the patron. Block S210 can additionally or alternatively collect taste feedback for a food item previously ordered by the patron, and subsequent Blocks of the second method S200 can cooperate to apply the patron's taste profile to a new order for the same food item, such as to subtly improve a match between the flavor of the food item to the patron's palate or to collect more specific feedback on nuances of the flavor of the food item and/or the patron's palate.

In one implementation, Block S210 collects taste feedback of the patron in the form of qualitative responses from the patron to the first food item through the native food ordering application following fulfillment of the first food order. In one example, the patron submits a food order through a native food ordering application executing on his mobile computing device (e.g., a smartphone), and the Block S210—implemented within the native food ordering application—tracks the user's location while inside a restaurant or within a predefined distance of a robotic food assembly apparatus (shown in FIG. 5) that fulfills the food order. In this example, once the patron moves outside of a geofenced area around the restaurant or moved beyond the predefined distance from the robotic food assembly apparatus—as detected through a location (e.g., GPS) sensor within he patron's mobile computing device—Block S210 delivers a notification to the patron through the native food ordering application to review his meal. In another example, the patron can submit his food order through a digital kiosk arranged within a restaurant and/or coupled to the robotic food assembly apparatus, the kiosk can collect the patron's email address, and Block S210 can email a survey for the food order to the patron's email address. However, Block S210 can prompt the patron to provide feedback for one or more food orders in any other way and through any other suitable conduit.

In this foregoing implementation, Block S210 can prompt the patron to enter absolute or scaled feedback for one or more parameters corresponding to the previous food order. For example, Block S210 can prompt the patron to select either of a "YES" or "NO" radio button for one or more of the following prompts: "are you full," "are you still hungry," "was your burger too greasy," "was your patty undercooked," "what your burger too salty," "did your burger have enough veggies," "did we add enough mustard," "did you like the pickles on your burger," and/or "would your burger have tasted between with poppy seeds on your bun," etc., as shown in FIG. 4. Block S210 can additionally or alternatively prompt the patron to move a slider bar between "not enough" and "too much" positions or between "not satisfied" and "fully satisfied" positions for one or more of the following prompts: "did you get enough to eat," "did your burger have enough relish," "was your bun sufficiently toasted," "did we properly cook your patty to medium-rare," and/or "was you burger at the right temperature when you began to consume it," etc., as shown in FIG. 4. Block S210 can present any of these prompts to the patron through the food ordering application, through an email application, or through a web browser, etc. executing on the patron's mobile computing device or other computing device accessed by the patron. However, Block S210 can collect any other feedback related to the patron's previous food order and in any other way.

Block S210 can additionally or alternatively retrieve one or more food orders previously submitted by the patron and extract types of food items, ingredient additions and subtractions, and/or food preparation elections selected by the patron. For example, Block S210 can retrieve a set of food orders from a database of previous food orders submitted to a particular robotic food assembly apparatus, a set of robotic food assembly apparatuses, a food truck, a set of food trucks, a restaurant, and/or a restaurant chain, etc., wherein food orders in the set are grouped by a phone number, a system of payment (e.g., a credit card), an ordering account username or profile, email address, or other identifier provided by the patron with submission of each order. Block S210 can then extract relevant food types, ingredient additions and subtraction, and/or preparation selections from the food orders in specific to the patron. However, Block S210 can collect food order and/or food item feedback related to the patron in any other suitable way.

2.2 Absolute Food Preference

Block S220 of the second method S200 recites predicting an absolute food preference of the patron from the first food order. Block S220 can similarly recite identifying an absolute food preference of a patron from a trend within a set of food orders previously submitted by the patron. Generally, Block S220 functions to extract one or more absolute food-related preferences from one or more food orders previously submitted by the patron. In particular, Block S220 identifies trends in food orders submitted by the patron, such as orders for various food types (e.g., hamburgers, hot dogs, omelets, salads, and/or burritos, etc.), orders for a particular food type (e.g., hamburgers), or orders for a particular category or genre of a particular food type (e.g., Asian-style hamburgers, gourmet hamburgers, cheeseburgers, bacon and mushroom cheeseburgers, or veggie burgers, etc.).

In one example, Block S220 analyzes a set of previous food orders submitted by the patron and identifies habitual preparation, ingredient addition, and/or ingredient deletions elections made by the patron across the set of previous food orders. In this example, if the patron submits ten orders for a hamburger over the course of eight weeks, and nine out of the ten orders elected medium-rare and no pickles, Block S220 can predict that the patron prefers his hamburger patties cooked medium-rare and his hamburger delivered without pickles. Furthermore, in this example, if two of the ten orders elected no tomatoes, five of the ten orders specified extra tomatoes, and the remainder of the ten orders elected no change to the amount of tomatoes specified in the stock recipes for the corresponding burgers, Block S220 can tag changes to stock tomato specifications as non-habitual.

In one implementation, Block S220 correlates election of a particular ingredient for addition to one or more food items—of a particular food type—in previous food orders with a preference for the particular ingredient in food items of the particular food type. For example, Block S210 can collect food orders specific to hamburgers previously ordered by the patron, and Block S220 can correlate consistent (e.g., repeated) election of a particular topping (e.g., pickles, lettuce, tomato, fried egg, or jalapeños, etc.) for addition onto an ordered hamburger with the patron's preference for addition of the particular topping onto any hamburger ordered by the patron. In this implementation, Block S220 can also apply different thresholds to consistency or repetition of topping addition election based on a commonality of the ingredient. For example, Block S220 can set a low threshold for patron preference for common ingredients like tomato, onion, lettuce, etc. such that a preference for such a common ingredient is associated with the patron if the patron elects to add such a common ingredient at a relatively low frequency (e.g., within at least 65% of orders). In this example, Block S220 can also set a high threshold for patron preference for uncommon ingredients like fried egg, apple, and guacamole, etc. such that a preference for such an uncommon ingredient is associated with the patron only if the patron elects to add such an uncommon ingredient at a relatively high frequency (e.g., within at least 90% of orders).

Block S220 can similarly identify a trend in elected omission of a particular ingredient in one or more food orders previously submitted by the patron. In particular, Block S220 can correlate deletion of a particular ingredient from one or more previous orders for a particular type of food item with a distance for the particular ingredient in food items of the particular food type. For example, Block S210 can collect food orders specific to hamburgers previously ordered by the patron, and Block S220 can correlate consistent deletion of a particular topping from hamburger orders with the patron's preference that the particular topping not be served with his hamburgers.

Block S220 can also identify a trend in food item preparation election by the patron and correlate this trend with a preference for how a particular type of food item is prepared. For example, Block S220 can identify a trend in election of a particular meat doneness for hamburgers ordered by the patron across multiple food orders. For example, if the patron routinely orders his hamburger patty well-done, Block S220 can identify a patron preference for well-done hamburger patties. Block can yet similarly identify a trend in food item size election by the patron and correlate this trend with a preference food item size. For example, if the patron consistently orders hamburgers with ⅓ lb. patties, Block S220 can correlate this patron elections with a preference for hamburgers with ⅓ lb. patties.

However, Block can identify a patron preference for any other absolute parameter for any food order, for a food item of a particular type, or for a food item within a particular category or genre of a particular food item type, such as (maximum) price, (maximum number of) calories, bun type or style, ingredient (e.g., sauce, topping, cheese), combinations of ingredients, meat type or blend of meats in a patty, delivery method (e.g., plated, wrapped, or boxed), etc.

2.3 Relative Taste Preference

Block S230 of the second method S200 recites predicting a relative taste preference of the patron based on the taste feedback and a recipe of the first food item. Block S230 can similarly recite identifying a relative taste preference of the patron from the set of food orders. Generally, Block S230 functions to extract one or more relative food-related preferences from one or more food orders and/or food order feedback previously submitted by the patron. In particular, Block S230 identifies patron preferences for relative degrees of parameters of a food item, such as how much of an ingredient to include or to what extent to prepare (e.g., cook) an ingredient relative to standard (i.e., stock) recipe for a food item.

In one implementation in which Block S210 collects qualitative feedback from the patron in the form of radio button selections and/or sliders bar adjustments, Block S230 can correlate a qualitative response submitted by the patron with a preference for a relative quantitative difference between a delivered amount of a particular ingredient in a food item and a standard amount of the particular ingredient specified in a stock recipe for the food item. In one example in which Block S210 prompts the patron to respond to the question "was your burger too greasy" by selecting a "YES" or a "NO" radio button, Block S230 can correlate a "NO" response with either no preference for greasiness of a hamburger or with indicator that the (actual or predicted) greasiness of the hamburger was satisfactory. However, in this example, Block S230 can correlate a "YES" response to this question with a patron preference for a quantitative reduction in greasiness in delivered hamburgers, such as 25% less grease than standard for all hamburgers ordered by the patron. In this example, Block S220 can additionally or alternatively implement this patron feedback to set a maximum greasiness of 8% by mass for all hamburgers ordered by the patron. In a similar example in which Block S210 prompts the patron to respond to the question "did your burger have enough veggies" by selecting a "YES" or a "NO" radio button, Block S230 can correlate a "NO" response with a preference for more veggies on all hamburgers ordered by the patron (or all burgers of the same type or category), such as a preset step increment of 20% more veggies by weight—relative to a standard or stock recipe—for all hamburgers ordered by the patron (or all burgers of the same type or category). However, Block S230 (and Block S220) can similarly correlate binary (i.e., "YES" or "NO") feedback for any other related question with a preference for a relative change in an amount of an ingredient or preparation procedure for a food item, such as relative to a stock recipe for a food item.

In another example of the foregoing implementation in which Block S210 receives a slider bar adjustment between a "not enough" position and a "too much" positions for a prompt reciting "did your burger have enough relish," Block S230 can assign the extreme "not enough" position with a patron preference for 25% more relish, the extreme "too much" with a patron preference for 25% less relish, and the center position on the slider bar with a preference for no change in application of relish on the corresponding food item, and Block S230 can extrapolate preferences for percentage changes in delivered relish along a spectrum between 25% less and 25% more based on final placement of the slider along the slider bar. In this example, Block S230 can thus identify a patron preference for application of a single ingredient into a food item. In a similar example in which Block S210 receives a slider bar adjustment between a "not enough" position and a "too much" positions for a prompt reciting "was your burger salted to taste," Block S230 can assign the extreme "not enough" position with a patron preference for 15% more total salt, the extreme "too much" with a patron preference for 15% less total salt, and the center position on the slider bar with a preference for no change in total salt content of the corresponding food item, and Block S230 can extrapolate preferences for percentage changes in total burger salt content along a spectrum between 15% less and 15% more based on final placement of the slider along the slider bar. Thus, in this example, Block S230 can identify a patron preference for an aggregate amount of an ingredient in a food item relative to a stock or standard amount of the ingredient specified in a recipe, or Block S230 can identify a patron preference for an relative amount of the ingredient in multiple components of a food item, such as an amount of salt in a bun, an amount of salt in a burger patty, and/or an amount of salt in a sauce or relish, etc. Block S230 can thus extrapolate—from qualitative feedback provided by the patron—a preference for a percentage difference between a delivered amount of an ingredient (e.g., salt, pickle, tomato, ground beef, etc.) in a food item and a standard amount of an ingredient specified in a recipe for the food item.

Block S230 can also identify preferred combinations (i.e., ratios) of ingredients in a food item from qualitative feedback collected from the patron in Block S210. In one example in which Block S210 receives a slider bar adjustment between a "not enough" position and a "too much" positions for a prompt reciting "did your burger have the right amount of 'gameyness,'" Block S230 can assign a spectrum of ratios of ground lamb to ground beef in hamburger patties to slider positions along the slider bar, such as a lamb-to-beef ratio of 1:0 for the extreme "not enough" position, a lamb-to-beef ratio of 0:1 for the extreme "too much" position, a lamb-to-beef ratio of 1:1 for the center between the two extreme positions, and a linear change between the 1:0 and 0:1 positions therebetween. Block S230 can thus extrapolate a preference for a patty meat blend from qualitative feedback provided by the patron.

Block S210 can additionally or alternatively collect quantitative feedback from the patron, such as by receiving a response to a prompt "should we change the amount of salt in your burger next time" in the form of a slider position selection between "20% less" and "20% more" positions, and Block S230 can identify a patron taste preference accordingly.

In the foregoing implementations and examples, Block S230 can also normalize definitions assigned to the extremes of slider bar. For example, one patron may historically treat a slide bar as a ternary input selection for "too rare," "perfect," and "too done" in response to a prompt reciting "was your patty cooked to your liking," and Block S230 can convert a bar position nearest the "too rare" to a patron preference for a center patty temperature that is 5° F. higher than the center temperature of the corresponding delivered patty and a bar position that is nearest the "too done" position to a patron preference for a center patty temperature that is 2° F. lower than the center temperature of the corresponding delivered patty. In this example, a second patron may historically pay careful attention to the position of the slider bar, and Block S230 can thus handle a slider bar input for patty doneness as a continuum of preferred changes in center patty temperature, such as to a resolution of 0.1° F. In this example, Block S230 can thus analyze the patron's feedback history to identify how the patron responds to prompts and then normalize new feedback accordingly.

Block S230 can also normalize a particular feedback to a corresponding food item order. For example, the patron can customize a standard hamburger by ordering the hamburger with extra (e.g., 100% extra) pickles, and Block S210 can receive feedback from the patron indicating that the hamburger can too many pickles. Block S230 can thus extrapolate a patron preference for more than a standard amount of pickles specified in a hamburger recipe but less than 100% extra pickles in a deliver hamburger. In this example, Block S230 can thus cooperate with Block S240 to set a target difference of a 50% increase in delivered pickles over a standard amount of pickles specified in a hamburger recipe for hamburgers ordered by the patron.

Like Block S220, Block S230 can extrapolate a relative taste preference of the patron from a series of orders submitted by the patron over time. In particular, Block S230 can identify trends in order feedback provided by the patron, in food items types (or categories, genres, etc.) ordered by the patron, and/or in ingredients added and/or or removed from food items ordered by the patron, and Block S230 can extrapolate one or more taste preferences from these trends.

For example, if the patron repeatedly supplied feedback indicating that his hamburger was too greasy, Block S230 can identify a patron preference for less grease in his hamburger with a sufficiently high degree of confidence. In another example, if the patron occasionally provides feedback indicating that his burger was too salty and other times provides feedback that his burger was under-salted, Block S230 can ignore this feedback as lacking consistency (e.g., impulsive). However, in this example, Block S230 can combine these over- and under-salted feedback responses with a known or predicted amount of salt (and other parameters) delivered in the corresponding hamburgers—such as feedback indicating too much salt in a large bacon and cheddar cheese burger and feedback indicating too little salt in a small plain hamburger with lettuce—to extrapolate a preference for a particular amount of salt in a hamburger, a preference for a particular percentage of salt by weight in a hamburger, or a suitable range of total salt or percentage salt by weight in a hamburger, etc.

Like Block S220, Block S230 can identify relative taste preferences that correspond to multiple food types (e.g., hamburgers, hot dogs, omelets, salads, and/or burritos, etc.), that correspond to a particular food type (e.g., hamburgers), and/or that correspond to a particular category or genre of a particular food type (e.g., Asian-style hamburgers, gourmet hamburgers, cheeseburgers, bacon and mushroom cheeseburgers, or veggie burgers, etc.). For example, as a preceding example in which the patron submits ten orders for a hamburger over the course of eight weeks, and nine out of the ten orders elected medium-rare and no pickles, if two orders specified no tomatoes were for bacon, mushroom, and cheese burgers, if the five orders specifying extra tomatoes were for veggie hamburgers, and the two orders specifying the standard amount of tomato were for plain hamburgers, Block S230 can determine that the patron does not like tomatoes on his bacon, mushroom, and cheese burgers, that he prefers extra tomatoes on his veggie burgers, and that he trusts a preset amount of tomatoes for his standard hamburgers (i.e., as defined in a recipe for standard hamburgers).

Block S230 can also combine taste feedback of the patron with taste feedback of another patrons to predict a taste preference of the patron, such as if limited taste feedback is available from the patron. For example, if only one or two feedback examples are available from the patron though the patron has submitted several (e.g., more than ten) orders for hamburgers, Block S230 can identify a second patron who has ordered similar hamburgers and/or provided feedback similar to that provided by the patron. Block S230 can then apply taste preferences of the second patron to the patron to augment or supplement predicted taste preferences of the patron. Block S230 can additionally or alternatively access a demographic of the patron, identify a second patron of a demographic similar to the demographic of the patron, and apply (e.g., merge) a relative food preference of the second patron with taste feedback submitted by the patron to predict a relative taste preference of the patron.

2.4 Taste Preference Conditions

Blocks S220 and S230 can also identify trends in patron elections or feedback for absolute or relative food item parameters based on meal type, time of day, day of week, patron mood, total meal size, etc. and identify or predict the patron's taste preferences for these one or more conditions accordingly. For example, Block S220 can identify a patron preference for veggie patties and Block S230 can identity a patron preference for 50% more lettuce and tomatoes for hamburgers ordered around lunch time on weekdays, and Blocks S220 and S230 can cooperate to identify patron preferences for rare 50% beef and 50% bison patties, mushrooms, and double cheddar cheese for hamburgers ordered around on Friday and Saturday evenings. Block S240 can thus generate multiple taste profiles for the patron, each associated with one or more conditions defining its application, such as meal type, time of day, day of week, patron mood, and/or total meal size, etc. for an order initiated by the patron.

However, Blocks S230 and S240 can functions in any other way to extract absolute and relative taste preferences of the patron, respectively, from previous food orders and/or food order feedback previously submitted by the patron.

2.5 Taste Profile

Block S240 of the second method S200 recites generating a taste profile of the patron based on the absolute food preference and the relative taste preference. Generally, Block S240 functions to aggregate one or more absolute and relative taste preferences of the patron into a taste profile that can be applied to subsequent food orders submitted by the patron to automatically personalize these subsequent food orders for the patron. For example, Block S240 can generate a taste profile that is applied to an any food order submitted to a robotic food assembly apparatus or to a restaurant within a restaurant chain, to any food item of a particular type (e.g., a hamburger), to any food item within a particular category or genre food type (e.g., veggie burgers, Asian-style hamburgers). Block S240 can also aggregate absolute and/or relative taste preferences of the patron into multiple taste profiles, each corresponding to a different single or set of conditions, such as a food item type, a food item genre or category, the patron's mood, a meal type, a time of day, a day of the week, and/or a meal size, etc.

In one example implementation, Block S240 generates the taste profile that specifies absolute and relative values for constructing a hamburger to satisfy the patron's palate, Block S240 can generate a taste profile that specifies an absolute or relative amount of one or more ingredients (e.g., toppings, condiments) to be included in a hamburger ordered by the patron, a type and/or amount of meats and extra ingredients to form into a patty for a hamburger ordered by the patron, a target doneness level for a patty in a hamburger ordered by the patron, a bread type and toast level of a bun in a hamburger ordered by the patron, a saltiness and greasiness level of a hamburger ordered by the patron, a maximum number of calories (or calories from fat, carbohydrates, etc.) in a hamburger ordered by the patron, and/or a maximum price of a hamburger ordered by the patron, etc. In this example implementation, once a new order or selection for a hamburger is received from the patron in Block S250, Block S260 can apply the patron's taste profile to the selected hamburger, such as by compromising these parameters for the particular hamburger selected as described above in the first method S100.

Once the taste profile is generated for the patron, Block S240 can store the patron's taste profile locally with the patron, such as on a mobile computing device (e.g., a smartphone) executing a native food ordering application used by the patron to order food items. Alternatively, Block S240 can store the patron's taste profile remotely such as in a database of taste profiles connected to a computer network. Block S240 can thus associated the taste profile with an identifier of the corresponding patron, such as a system of payment (e.g., a credit card), a phone number, an email address, a name, or a username and password, etc. such that the taste profile can be recalled and properly applied to future orders by the patron.

However, Block SS240 can function in any other way to aggregate taste preferences identified in Block S220 and S230 into a taste profile defining application of the patron's taste preferences to food items subsequently ordered by the patron.

2.5 New Food Order

Block S250 of the second method S200 recites from the patron, receiving a selection for a food item in a new food order. Generally, Block S250 can implement methods and techniques similar to Block S110 of the first method S100 to receive a selection for a food item in a new food order. For example, the patron can initiate a new food order through a native food ordering application executing on his smartphone, wherein the native food ordering application displays a menu of food items supported by a robotic food assembly apparatus within a nearby restaurant or within a restaurant currently occupied by the patron, and Block S250 can receive a selection for a new food item from the menu of supported food items through the native food ordering application. Alternatively, the patron can initiate a new food order through an electronic kiosk arranged within a restaurant or connected to a robotic food assembly apparatus within a restaurant occupied by the patron, and Block S250 can receive a selection for a new food item through the electronic kiosk. However, Block S250 can collect a selection for one or more food items in a new food order from the patron in any other suitable way.

2.6 Personalized a Recipe

Block S260 of the second method S200 recites applying the taste profile of the patron to a recipe for food item in the new food order to generate a personalized recipe. Generally, Block S260 functions to apply an absolute taste preference and/or a relative taste preference of the patron to a standard or custom food item ordered by the patron, thereby improving alignment of a flavor profile of the (new) food item to the patrons palate and thus automatically 'personalizing' the standard or custom food item for the patron. In particular, Block S260 accesses a (standard or custom) recipe for the selected food item and modifies types and/or amounts of ingredients and cooking parameters for the food item specified in the recipe. In one example, Block S250 receives a section for a BBQ bacon cheddar hamburger, a menu item that the patron has not ordered before (or has not ordered within a threshold period of time, such as within the past six months), and Block S260 applies the taste profile—which was generated by analyzing food orders and patron feedback for other food items—to the BBQ bacon cheddar hamburger to substantially ensure that a flavor profile of the BBQ bacon cheddar hamburger aligns with patron's taste preferences. In another example, Block S250 receives a selection for a custom hamburger with a fried egg and sprouts, a custom hamburger that the patron has ordered previously and that was previously analyzed in Blocks S220 and S230, and Block S260 applies the patron's taste profile to the custom hamburger to better match that flavor profile of the custom hamburger to the patron's palate in comparison an order for the same custom hamburger that was previously delivered to the patron.

Block S260 can apply the taste profile of the patron to a food item added to a new food order as the patron assembles the food order (e.g., at a kiosk within a restaurant location), once the patron submits the food order and before the food order is uploaded to a food ordering system (e.g., within a native food ordering application executing on the patron's smartphone), and/or once the food order is submitted to the food ordering system (e.g., on a remote server or computer network connected to a robotic food assembly apparatus). For example, Block S260 can access the patron's taste profile from local memory within the patron's mobile computing device as the patron interfaces with a native food ordering application executing thereon to build an order. Block S260 can similarly retrieve the taste profile from a remote server, such as based on a user profile logged-in to the native food ordering application executing on the patron's mobile computing device. Alternatively, Block S260 can access or retrieve the taste profile and apply the taste profile to a new food order accordingly by matching identifying information extracted from a system of payment supplied by the patron to a particular taste profile stored in a taste profile database. However, Block S260 can access and select the taste profile for the patron in any other suitable way.

In one implementation, Block S260 applies an absolute taste preference of the patron to the food item in the new food order. In one example, for the taste profile that specified dislike for a particular ingredient, Block S260 accesses a standard recipe for the selected food item and generates a personalized recipe that omits the particular ingredient from the standard recipe for the food item selected by the patron. In a similar example, the taste profile specifies a dislike for a particular ingredient if a second ingredient is included in a food item, and Block S260 accesses a standard recipe for the selected food item, identifies the second ingredient in the standard recipe for the selected food item, and generates a personalized recipe that omits the particular ingredient from the standard recipe on behalf of the patron. Block S260 can similarly generate a personalized recipe that adds a particular ingredient to a standard recipe for a selected food item based on the taste profile for the patron, such as by specifying addition of (a present or standard amount of) tomato or relish in a recipe for a hamburger ordered by the patron. In another example, Block S260 can generate the personalized recipe that specifies a particular meat doneness, a patty size, and/or a patty grind mix (e.g., 20% lamb, 80% beef) for a hamburger selected by the patron. However, Block S260 can apply any other absolute taste preference to a standard, stock, or custom recipe for a food item selected by the patron to generate a personalized recipe for the food item that compensates for the patron's palate.

In another implementation, Block S260 applies a relative taste preference of the patron to the food item in the new food order. In one example, Block S260 generates the personalized recipe that specifies an amount of a particular ingredient to include in the food item based on a relative taste preference defined in the taste profile and a standard amount of the particular ingredient specified in the stock recipe. In this example, Block S260 can specify 23% more BBQ sauces than set in the standard recipe and/or 33% less pickle that set in the standard recipe for a hamburger.

Block S260 can also selectively apply absolute and relative taste preferences defined in the patron's taste profile. For example, Block S240 can generate the taste profile that assigns conditions to various absolute and relative taste preferences, such as time of day, meal type, day of week, location, etc. In this example, Block S260 can test a current condition when the patron initiates an order (or at a time that the patron specifies for pickup of the order) to select taste preferences in the taste profile are currently applicable to the order, and Block S260 can apply these taste preferences to the food order accordingly.

Block S260 can also apply a patron's absolute and/or relative taste preferences across categories or genres of food. For example, previous Blocks of the method can extrapolate taste preferences from the patron's previous orders for salads, burritos, pizza, ice cream cookie sandwiches, hot dogs, deli sandwiches, falafel, gyros, layered cakes, crepes, waffles, pancakes, and/or omelets and generate a taste profile of the user accordingly, and Block S260 can apply this (generic) taste profile of the patron to a new order submitted by the patron for tacos, thereby tailoring the tacos to the user's taste preferences even if the patron has not previously ordered tacos. In this example, Block S260 can also select past food orders by the patron that are particularly relevant to the new food order (e.g., crepes, burritos, and deli sandwiches with similar ingredients) and trigger Block S240 to generate a taste profile from these select orders.

However, Block S260 can function in any other way to adjust or modify a stock, standard, or existing customized recipe for a food item according to any one or more absolute and/or relative taste preferences defined in the patron's taste profile to personalize the recipe for the food item for the patron prior to preparation of the food item.

Block S270 of the second method S200 recites submitting the personalized recipe with the new food order to a robotic food assembly apparatus. Block S270 can similarly recite submitting the personalized recipe with the new food order to a food ordering system. Generally, Block S270 functions like Block S150 of the first method S100 to deliver the food order with the personalized recipe generated in Block S260 to a system or apparatus that handles preparation and delivery of the food item. For example, Block S270 can upload the personalized recipe with the food order to a computer network connected to the robotic food assembly apparatus—described above—which automatically implements the personalized recipe to build the corresponding personalized food item (e.g., a hamburger) for the patron. However, Block S270 can function in any other way to transmit, upload, or otherwise deliver the food order with the personalized recipe to a robotic food assembly apparatus, to a food ordering system, etc. on behalf of the patron.

2.7 Sharing

In one application, the second method S200 further includes Block S280, which recites, from a first patron, receiving a first order for a custom food item, and Block S290, which recites, in response to authorization by the first patron, sharing the custom order with a second patron. Generally, in this application, Blocks S280 and S290 cooperate to collect a custom food order from one patron (i.e., the first patron) and to then share the custom food order with another patron (i.e., the second patron). Once the custom food item is selected for the new food order by the second patron in Block S250, Blocks S240 and S260 cooperate to automatically apply the second patron's taste preferences to the custom food item to align the types, quantities, and preparation of ingredients in the custom food item to the taste preferences of the second patron. For example, if the custom food item was ordered by the first patron with minimal salt and extra mustard, once the second patron selects the custom food item in Block S250, Block S240 can retrieve the second patron's taste profile that defines a preference for extra (e.g., 32% more) salt and limited (e.g., no more than 5% total mass of the food item) mustard, and Block S260 can modify the custom recipe accordingly before delivery of the personalized recipe to a local restaurant and/or robotic food assembly apparatus on behalf of the second patron.

Alternatively, in this application, Blocks S240 and S260 can apply the second patron's taste profile to the advertisement such that the recipe for the custom food item is personalized for the second patron before the second patron even selects the custom food item for a new food order. For example, if the custom food order previously submitted by the first patron specifies a hamburger with pickles, ketchup, jalapeños, and bleu cheese but the second patron's taste profile precludes pickles, Block S260 can edit the custom recipe that is advertised to the second patron such that the second patron only sees—and can select for his food order—a hamburger with ketchup, jalapeños, and bleu cheese.

In this application, Block S280 recites, from a first patron, receiving a first order for a custom food item. Generally, Block S280 functions like Blocks S110 and S120 of the first method S100 to collect a custom food order from the first patron, such as a food order defining a selection for a particular type of hamburger with a particular set of toppings. Once the first patron submits the order for the custom food item, Block S280 can store the custom order (e.g., on a remote server or computer network) such that the custom order can be later copied into a new order once selected by the second patron.

Block S280 can also retrieve a (first) taste profile corresponding to the first patron and then normalize the order for the custom food item according to (absolute and/or relative) taste preferences of the first patron as defined in the first patron's taste profile. For example, if first taste profile indicate that the first patron prefers 50% less mustard than normal (i.e., relative to standard recipes), twice at much tomato as is normal, and 40% lamb and 60% beef patties rather than 100% beef patties in his hamburgers, Block S280 can normalize the custom order for the food item—as ordered by the first patron—by increasing the amount of mustard specified in the recipe for the custom food item by 100% (to offset the 50% reduction typical of the first patron), reducing the amount of tomato specified in the recipe for the custom food item by 50% (to offset the 100% increase in tomato typical of the first patron), and resetting the patty composition of the recipe for the custom food item to 100% beef. Block S280 can thus store a 'normalized' version of the custom food item, which can then be personalized for the second patron with the second patron's taste profile once elected in a subsequent food order by the second patron.

Furthermore, in this application, Block S290 recites, in response to authorization by the first patron, sharing the custom order with a second patron. Generally, Block S290 functions to present the custom food order for the custom food item to the second patron and to cooperate with Block S250 to enable the second patron to 'copy' the custom food item into his own (new) food order. Thus, Block S290 and Block S250 can cooperate to enable the second patron to order the same custom (or even standard) food item ordered locally (e.g., at the same restaurant) or remotely (e.g., in a different city or country) by the first patron who may be a friend, a family member, a celebrity, etc.

In one implementation, once the first patron submits the order for the custom food item, Block S290 prompts the first patron to share the custom order. For example, after the first patron submits his custom food order, Block S290 can prompt the first patron to share his custom order on an online social networking system and then automatically post the custom order—with a corresponding custom recipe for the food item and/or a pointer (i.e., electronic link) to the custom recipe for the food item—in a public venue within the online social networking system on behalf of the first patron once the first patron confirms the sharing action. A post for the custom food item can then be accessed by users who follow, who are connected to, who are friends with, or who are otherwise granted access to food orders made by the first patron. In this example, the second patron can review the post on the online social networking system through a native social networking application or web browser executing on a computing device (e.g., a smartphone or tablet) and then select a link or other pointer within the post to initiate a new food order with the custom food item, such as within the online social networking system or within a food ordering application also executing on the computing device and which is automatically opened upon selection of the post or pointer within the native social networking application or web browser. Alternatively, Block S290 can transmit an email notification or other electronic communication—for the custom order shared by the first patron—directly to the second patron, such as by transmitting a notification to the second patron's mobile computing device, transmitting an email to the second patron's email account, presenting the custom order within the second patron's food ordering account accessed through a native food ordering application executing on the patron's mobile computing device, or by posting a notification directly onto the patron's profile within the social networking system.

Block S290 can also selectively share the custom order with the second patron. For example, Block S290 can access a (first) taste profile of the first patron, compare this taste profile with the taste profile of the second patron, and then share the custom food item with the second patron only if the taste profiles of the first and second patrons exhibit at least a threshold similarity. In a similar example, Block S290 can access an order history of the first patron, compare this order history with order history of the second patron, and then share the custom food item with the second patron only if the order histories of the first and second patrons exhibit at least a threshold similarity, such as at least a threshold number of orders for identical food items (e.g., the same cheeseburger) within a threshold period of time (e.g., six months). However, Block S290 can share the first patron's custom order with the second patron in any other suitable way and/or in response to any other condition or similarity between the first and second patrons.

In this application, Block S250 can thus receive a selection by the second patron for the custom food item from within an email, within a native food ordering application executing on the second patron's (mobile) computing device, within a web browser, and/or within an online social networking system, etc. Blocks S240, S260, and S270 of the second method S200 can then execute as described above to access a taste profile of the second patron, to apply the taste profile of the second patron to the custom food item to personalize the custom food item for the second patron, and to then submit a food order for the personalized food item to a food ordering system and/or to a robotic food assembly apparatus for delivery to the second patron.

In one example, if the second patron initiates a new food order from a native food ordering application executing on his smartphone (or other mobile computing device), Block S240 can retrieve the taste profile that is stored locally in memory on the second patron's smartphone. Block S260 can then execute locally on the second patron's smartphone to personalize the recipe for custom food item for the second patron. Alternatively, the native food ordering application executing on the second patron's smartphone can pass an identifier of the second patron to a food ordering system that can then retrieve the taste profile from a database of taste profiles based on the identifier of the second patron. In this example, once Block S250 receives the selection for the custom food item from the second patron, Block S260 can execute on the food ordering system (or other computer network) to apply the second patron's taste profile to the recipe for the custom food item selected by the second patron. However, Block S240 can select, identify, and/or retrieve the taste profile of the second patron from any other local or remote memory or database, and Block S260 can execute locally (e.g., on the second patron's smartphone) or remotely (e.g., on a computer network or food ordering system) to modify the recipe for the custom food item specifically for the second patron.

However, Blocks S280, S290, S250, S240, S260, and S270 can cooperate in any other way to share a custom food item ordered by a first patron with a second patron and to automatically personalize the custom food item for the second patron based on the second patron's taste profile.

The second method S200s and robotic sandwich assembly apparatus of the embodiments can be embodied and/or implemented at least in part as a machine configured to receive a computer-readable medium storing computer-readable instructions. The instructions can be executed by computer-executable components integrated with an application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for preparing personalized food orders, the method comprising:
   accessing a current ingredient configuration of a food assembly apparatus;
   retrieving a set of food orders previously submitted by a patron, wherein the set of food orders comprises a first food order specifying a first food item and wherein the set of food orders is stored in a database;
   following fulfillment of food orders in the set of food orders, calculating an absolute food preference, of the patron, based on ingredients specified for inclusion and omission in the set of food orders;
   calculating a relative taste preference, of the patron, defining a preference of the patron for a percentage difference between a delivered amount of a first ingredient in the first food item and a standard amount of the first ingredient specified in a standard recipe for the first food item based on the set of food orders and a set of standard recipes;
   generating a taste profile of the patron based on the absolute food preference and the relative taste preference;
   receiving, from the patron through an ordering application, a selection for a second food item in a new food order supported by the current ingredient configuration of the food assembly apparatus, wherein the second food item is different from the first food item;

applying the taste profile of the patron to a standard recipe for the second food item to generate a personalized recipe that specifies a target amount of the first ingredient in the second food item based on a standard amount of the first ingredient specified in the standard recipe for the second food item and the relative taste preference; and controlling actuators within the food assembly apparatus to assemble the second food item according to the personalized recipe.

2. The method of claim 1, wherein:

the first food item is an instance of a first food type, calculating the absolute food preference comprises correlating election of a particular ingredient for addition to the first food item in the first food order with a preference for the particular ingredient in food items of the first food type, generating the taste profile comprises specifying addition of the particular ingredient to food items of the first food type, and applying the taste profile to the standard recipe for the second food item comprises, in response to the second food item being an instance of the first food type, specifying addition of the particular ingredient to the second food item in the personalized recipe.

3. The method of claim 2, wherein:

the first food type is a hamburger, and the particular ingredient is a hamburger topping.

4. The method of claim 1, wherein:

the ordering application executes on a mobile computing device, the ordering application displays a menu of food items supported by the current ingredient configuration of the food assembly apparatus, the taste profile is stored on the mobile computing device, and the personalized recipe is uploaded to the food assembly apparatus via a computer network.

5. The method of claim 4, further comprising:

receiving an input from the patron for the first food item through the ordering application following fulfillment of the first food order, wherein the input specifies a preference of the patron for a difference between a delivered amount of a particular ingredient in the first food item and a standard amount of the particular ingredient and wherein calculating the relative taste preference is based on the input.

6. The method of claim 1, wherein calculating the relative taste preference of the patron comprises:

accessing a demographic of the patron, identifying a second patron of a demographic similar to the demographic of the patron, and updating the relative taste preference of the patron based on the relative taste preference of the second patron.

7. The method of claim 1, wherein calculating the relative taste preference of the patron comprises:

extrapolating a trend in custom ingredients ordered by the patron in the set of food orders comprising the first food order; and aggregating the trend in custom ingredients ordered by the patron into the relative taste preference.

8. The method of claim 1, wherein:

the first ingredient is seasoning, applying the taste profile of the patron to the standard recipe for the second food item comprises scaling the standard amount of the first ingredient specified in the standard recipe for the second food item to a target amount of seasoning based on the relative taste preference, and the standard amount of the first ingredient specified in the standard recipe for the second food item is a preset mass of seasoning.

9. A method for preparing personalized food orders, the method comprising:

receiving, from a patron through an ordering application executing on a computing device, a selection for a new food item in a new food order;

retrieving a set of food orders previously submitted by the patron and feedback from the patron corresponding to food orders in the set of food orders, wherein the set of food orders and the patron feedback is stored in a database;

identifying an absolute food preference, of the patron, from a trend within the set of food orders;

based on the patron feedback following fulfillment of food orders in the set of food orders, identifying a relative taste preference, of the patron, comprising identifying a preference for a percentage difference between a delivered amount of a topping in a food item and a standard amount of the topping specified in a recipe for the food item;

generating a taste profile of the patron based on the absolute food preference and the relative taste preference;

applying the taste profile of the patron to a standard recipe for the new food item to generate a personalized recipe that specifies a target amount of the topping in the new food item based on a standard amount of the topping specified in the standard recipe for the new food item and the preference for the percentage difference; and controlling actuators within a food assembly apparatus to assemble the new food item according to the personalized recipe.

10. The method of claim 9, wherein:

retrieving the set of food orders comprises retrieving a first food order for a first food item and a second food order for a second food item, the second food item is different from the first food item, and the new food item in the new food order is different from the first food item and the second food item.

11. The method of claim 9, wherein:

identifying the absolute food preference comprises identifying a trend in elected omission of a particular ingredient in food orders in the set of food orders, and applying the taste profile to the standard recipe for the new food item comprises generating the personalized recipe to omit the particular ingredient.

12. The method of claim 9, wherein:

identifying the absolute food preference further comprises identifying a trend in elected addition of a second particular ingredient in food orders in the set of food orders, and applying the taste profile to the standard recipe for the new food item comprises generating the personalized recipe to add the second particular ingredient.

13. The method of claim 9, wherein:
identifying the absolute food preference comprises identifying a trend in a particular meat doneness submitted with food orders in the set of food orders, and
applying the taste profile to the standard recipe for the new food item comprises generating the personalized recipe to specify the particular meat doneness for the new food item.

14. The method of claim 9, wherein:
identifying the absolute food preference comprises identifying a trend in food item size for food items of a particular food type within the set of food orders, and
applying the taste profile to the standard recipe for the new food item comprises, in response to the new food item being of the particular food type, generating the personalized recipe to specify a size of the new food item based on the trend in food item size.

15. The method of claim 14, wherein:
identifying the trend in item size comprises identifying the trend in food item size relative to time of day, and
applying the taste profile to the recipe for the new food item comprises generating the personalized recipe to specify the size of the new food item further based on a time of day that the selection for the new food item is received.

16. The method of claim 9, wherein:
the topping is tomato; and
the standard amount of the topping specified in the standard recipe for the new food item is a preset thickness of tomato.

17. A system comprising:
at least one processor; and
a non-transitory computer-readable medium configured to store instructions for execution by the at least one processor, wherein the instructions include:
  receiving, from a patron through an ordering application executing on a computing device, a selection for a new food item in a new food order;
  retrieving a set of food orders previously submitted by the patron and feedback from the patron corresponding to food orders in the set of food orders, wherein the set of food orders and the patron feedback is stored in a database;
  identifying an absolute food preference, of the patron, from a trend within the set of food orders;
  based on the patron feedback following fulfillment of food orders in the set of food orders, identifying a relative taste preference, of the patron, comprising identifying a preference for a percentage difference between a delivered amount of a topping in a food item and a standard amount of the topping specified in a recipe for the food item;
  generating a taste profile of the patron based on the absolute food preference and the relative taste preference;
  applying the taste profile of the patron to a standard recipe for the new food item to generate a personalized recipe that specifies a target amount of the topping in the new food item based on a standard amount of the topping specified in the standard recipe for the new food item and the preference for the percentage difference; and
  controlling actuators within a food assembly apparatus to assemble the new food item according to the personalized recipe.

18. The system of claim 17, wherein:
retrieving the set of food orders comprises retrieving a first food order for a first food item and a second food order for a second food item,
the second food item is different from the first food item, and
the new food item in the new food order is different from the first food item and the second food item.

19. The system of claim 17, wherein:
identifying the absolute food preference comprises identifying a trend in elected omission of a particular ingredient in food orders in the set of food orders, and
applying the taste profile to the standard recipe for the new food item comprises generating the personalized recipe to omit the particular ingredient.

20. The system of claim 17, wherein:
identifying the absolute food preference further comprises identifying a trend in elected addition of a second particular ingredient in food orders in the set of food orders, and
applying the taste profile to the standard recipe for the new food item comprises generating the personalized recipe to add the second particular ingredient.

21. The system of claim 17, wherein:
identifying the absolute food preference comprises identifying a trend in a particular meat doneness submitted with food orders in the set of food orders, and
applying the taste profile to the standard recipe for the new food item comprises generating the personalized recipe to specify the particular meat doneness for the new food item.

22. The system of claim 17, wherein:
identifying the absolute food preference comprises identifying a trend in food item size for food items of a particular food type within the set of food orders,
identifying the trend in item size comprises identifying the trend in food item size relative to time of day,
applying the taste profile to the standard recipe for the new food item comprises, in response to the new food item being of the particular food type, generating the personalized recipe to specify a size of the new food item based on the trend in food item size, and
applying the taste profile to the recipe for the new food item comprises generating the personalized recipe to specify the size of the new food item further based on a time of day that the selection for the new food item is received.

* * * * *